Patented June 22, 1926.

1,590,067

UNITED STATES PATENT OFFICE.

GEORGE W. ACHESON, OF CALDWELL, NEW JERSEY.

METHOD OF PREPARING PIGMENT-OIL COMPOSITIONS.

No Drawing.  Application filed February 5, 1926. Serial No. 86,349.

This invention is a novel method of preparing pigment-oil compositions such as are applicable to the manufacture of paints, varnishes, or analogous fluid-coating compositions comprising a pigment and a vehicle.

In my prior Patent No. 1,431,079, patented October 3, 1922, I have described a method of preparing such compositions, consisting in its preferred embodiment in preparing an emulsion of oil and water having a very finely subdivided pigment suspended therein, and then co-precipitating the pigment and the oil by the addition of an electrolyte. The resulting curd is freed from any remaining water and is directly available for the manufacture of paints and essentially similar oil-pigment compositions.

According to the present invention, which may be regarded, as least in certain of its aspects, as an improvement upon the foregoing method, I first prepare an aqueous paste containing the finely subdivided pigment. As in my previous process the pigment employed is preferably subjected to a preparatory treatment by the procedure known as "deflocculation", such procedure involving, as is now well understood by those skilled in this art, the mechanical working of the pigment, in paste form, in conjunction with certain organic bodies, such as tannin, extracts from roasted cereals or other starchy materials, etc., known as deflocculating agents; the effect of this treatment being to convert the pigment wholly or in part into a colloidal condition. My invention is not however limited in its application to such deflocculated pigments, but may be practiced, with less advantage, with any suitable pigment material in a state of sufficiently fine subdivision to permit of its suspension in such emulsions as are here contemplated.

To this aqueous paste, I add with intimate mixing, a relatively small proportion of the oil or varnish vehicle, say about one-third of the total oil content of the final paste, and continue the mixing for about twenty minutes. During this period no substantial separation of water is observed; and when deflocculated pigments are used these retain their colloidal character, in the sense that they retain their capacity for forming colloidal suspensions when diluted with pure water. At this stage, the mixture is a pasty oil-water-pigment emulsion in which the oil is the dispersed phase.

I then gradually add the balance of the oil, up to the full amount required by the particular pigment, various pigments differing rather widely among themselves with respect to the quantity of oil requisite for forming an oil paste. For example in the case of most carbon blacks the total amount of oil required is somewhat in excess of the dry weight of the pigment; whereas in the case of the heavier and less absorbent pigments, such for example as chrome yellow, the oil may be sixty percent or less of the weight of the pigment.

I prefer to add the oil slowly, continuously, and with intimate stirring or working, adding the oil only so rapidly as it is substantially absorbed by the paste, there being no visible excess of oil. This addition of oil is continued until water begins to appear, indicating the breaking of the emulsion. This generally occurs when about three-fourths of the total oil has been added, the precise point varying somewhat according to the particular nature of the pigment and oil used. Thereupon the balance of the oil may be quickly added, and the mixing continued to complete the separation of the water and the production of a homogeneous and smooth paste. The drying of this paste may be carried out as described in my above-mentioned patent.

It is important in the early stages of the operation that the oil should not be added much faster than it can be absorbed by the paste under the operating conditions. Should this be done there is a tendency to form emulsions in which the water is the dispersed phase, as distinguished from the emulsion first formed in which the oil is the dispersed phase. Should such emulsions be formed the oil tends to leave the paste, and it is sometimes necessary to correct this condition by adding more water, to restore an emulsion of the type in which the oil is dispersed; and then to proceed with the slow addition of oil as above described.

When the process is properly conducted it is possible to prepare the oil paste with certainty and rapidity, and without resort to the use of electrolytes as described in my prior patent. The paste as thus prepared is ready for packaging, constituting a stock material which may be compounded or diluted as desired with a variety of oily or other vehicles for the preparation of paints, varnishes, inks or other products.

My invention is of course not limited to the particular materials, proportions or manipulations given above by way of illustration. The word "oil" is used herein in its generic sense to include such neutral solvents and diluents, immiscible with water, as are commonly employed in the paint and varnish arts.

I claim:

1. Method of making pigment-oil compositions comprising preparing a pasty pigment-water-oil emulsion wherein the oil is the dispersed phase; working said paste and gradually adding oil thereto at a rate not substantially exceeding that at which the oil is absorbed; and continuing said addition until a separation of water occurs.

2. Method of making pigment-oil compositions comprising preparing a pasty emulsion of oil and water having a deflocculated pigment incorporated therewith; working said paste and gradually adding oil thereto at a rate not substantially exceeding that at which the oil is absorbed; and continuing said addition until a separation of water occurs.

In testimony whereof, I affix my signature.

GEORGE W. ACHESON.